3,417,031
PROCESS FOR THE PRODUCTION OF IRON
OXIDE CATALYSTS
Helmut Hinrichs, Leonding, near Linz, and Franz Thoma, Linz, Austria, assignors to Osterreichische Stickstoffwerke Aktiengesellschaft, Linz, Austria
No Drawing. Filed Oct. 22, 1965, Ser. No. 502,601
Claims priority, application Austria, Oct. 23, 1964,
A 8,989/64
1 Claim. (Cl. 252—472)

ABSTRACT OF THE DISCLOSURE

According to this invention superior results are achievable in the catalytic synthesis of ammonia by subjecting the sharp crushed material—resulting from the melting of a mixture of iron oxides, allowing the melt to cool, and crushing the cooled melt—to a rolling motion in a drum or the like to round off sharp edges and corners of the crushed material while retaining the rounded surfaces in rough state.

---

The present invention relates to a process for the production of an iron oxide catalyst.

Iron oxide catalysts for the high pressure synthesis of ammonia from nitrogen and hydrogen, as well as for other high pressure syntheses, are produced either by the oxidation of pure iron in a stream of oxygen or by melting down natural or synthetic magnetite having a specific Fe:O ratio in an electric furnace with the addition of activators, such as $Al_2O_3$, $SiO_2$, CaO, MgO, $Na_2O$, $K_2O$ or $TiO_2$, which homogeneously dissolve in given quantities in the iron oxide melt.

The performance of such a catalyst principally depends upon the above indicated composition, but other factors, such as the temperature existing at the catalyst surface, the operating pressure, the composition of the synthesis gas and particularly the impurities contained therein, also play an important part.

Besides the composition of the catalyst and the manner in which it has been melted down and cooled, purely external factors, such as those existing when the cooled melt has been crushed and classified, also determine its utility. By appropriately selecting the grain size of the sharp-edged crushed material and by producing sintered pressings of the previously pulverized molten material, efforts have been made to provide grain shapes that are desirable from the point of view of gas flow. However, these procedures cause fairly high losses and represent considerable complications which make the product more expensive.

In accordance with the present invention there is provided a process for the production of an iron oxide catalyst, which comprises melting a mixture of iron oxides, with or without the addition of activators, allowing the melt to cool, crushing the cooled melt and subjecting the resulting sharp-edged broken material to a rolling motion in a drum in order to produce a roughly spherical and at the same time roughened surface which is capable by adhesion of retaining some of the finest dust produced in rolling.

The steps that will be hereinafter described have been successful in reducing the resistance to the flow of gas through the catalyst and of simultaneously improving the catalyst activity. The first above-mentioned result is achieved by submitting the sharp crushed material of the cooled melt to a rolling motion in a drum and thereby removing the sharp edges and corners which in the past have made the loose material somewhat bulky. A nearly rounded roughly spherical shape is thus imparted to the broken grains and this permits the catalyst in the reactor to be more tightly packed, i.e., the quantity of catalyst in a given volume to be raised, even when a homogeneous class of grain is used while nevertheless the resistance offered by the catalyst to the flowing gas is significantly reduced.

As used herein, the term "drum" is intended to include any drum, rotary mill or other suitable device.

The rolling and abraiding treatment also roughens the surface of the grain of which the broken faces are originally quite smooth. The roughening process increases the surface area to some extent with a resultant improvement of the catalyst activity at the surface of the grain. At the same time, some of the pulverulent abraded dust formed in the rolling process remains adhering to the roughened surface even when the fines have been removed by classification, and the presence of this dust further enlarges active surface.

A catalyst that has been submitted to an after-treatment and abraded as above described exhibits a significantly higher long-period activity than a catalyst of like grain size of the same origin that has not been thus abraded. Using a catalyst treated according to the present invention in a reactor at 300 atm. operating pressure and a space velocity of 16,000, at a temperature within the range from 440° to 480° C., the synthesis of ammonia is 1% higher than in the case of an untreated catalyst. This corresponds to a 5% increase in mass turnover.

The adhesion of the ultrafine dust to the roughened surface can be further improved magnetically or by sintering a coarse grain catalyst dust on the grain that has been previously roughened as disclosed supra, and by then dusting the grain with a very fine dust.

The above described after-treatment of crushed catalyst material cannot be replaced by simply admixing fine material or by leaving the fines in the crushed cooled melt. Whereas the increase in surface area according to the invention does not significantly affect the external shape of the broken grains and only the roughly spherical form due to the rolling motion determines the flow conditions for the gas, the mere admixture of fine material operates to reduce the interstitial space in the bulk material, as in the mixing of cement, and therefore causes a rapid rise in flow resisance apart from involving the risk that the interstitial spaces may be completely choked.

Presently preferred exemplary embodiments of the invention are set forth as follows:

Example 1

A sharp-edges crushed and classified catalyst for the high pressure synthesis of ammonia, of grain size of 8 to 12 millimeters and of the following composition:

| | Percent by wt. |
|---|---|
| Iron$^{II}$ oxide | 38.1 |
| Iron$^{III}$ oxide | 50.9 |
| Silicon dioxide | 0.9 |
| Potassium oxide | 0.8 |
| Calcium oxide | 3.2 |
| Aluminum oxide | 3.2 |
| Titanium dioxide | 0.4 |
| Sodium oxide | 0.1 |
| Magnesium oxide | 2.4 | is subjected for thirty minutes to a rolling motion of 120 rotations per minute in a drum of a diameter of 800 millimeters. The input of sharp-edged catalyst is 100 kilograms or 25 liters. The drum has a volume of 150 kilograms. The obtained catalyst particles have their sharp edges rounded and their surface powdered with abraded dust.

The abraded catalyst is tested in comparison with the above-mentioned sharp-edged grains for determination of their activity in ammonia synthesis under the following conditions:

The abraded catalyst obtained by the after-treatment was placed in an ammonia-synthesis reactor consisting of several tubes. In this reactor, ammonia synthesis was carried out at 310 atm. operating pressure and a temperature of 480° C. The feed gas which consisted mainly of nitrogen and hydrogen had an inert gas content of 10 percent (methane and argon) and an ammonia content of 2 percent. The space velocity was 16,000. At the outlet of the reactor, the gas obtained had an ammonia content of 20.73 percent.

The procedure was repeated under the identical conditions except that the abraded catalyst was replaced by the corresponding amount of untreated sharp-edged catalyst of the same origin. At the outlet of the reactor, when using the untreated catalyst, the gas obtained had an ammonia content of 19.76 percent.

The synthesis of ammonia with the abraded catalyst was 1 percent higher than in the case of the untreated catalyst, corresponding to a 5.3 percent increase in mass turnover.

Using a catalyst of a grain size of 2 to 3 millimeters, a rolling motion treatment of 5 to 6 hours is necessary to obtain round shaped catalyst particles according to the invention.

EXAMPLE 2

An ammonia synthesis catalyst of the composition:

|  | Percent by wt. |
|---|---|
| Iron$^{II}$ oxide | 32.4 |
| Iron$^{III}$ oxide | 60.1 |
| Silicon dioxide | 0.48 |
| Potassium oxide | 0.56 |
| Calcium oxide | 3.10 |
| Aluminum oxide | 2.60 |
| Titanium oxide | 0.35 |
| Sodium oxide | 0.20 |
| Magnesium oxide | 0.21 | was subjected to a rolling and abrading treatment as described in Example 1 and then tested in comparison with the sharp-edged, untreated catalyst of the same origin, also as described in Example 1. An operating pressure of 310 atm. was employed, with a temperature of 440° C. The ammonio content of the gas obtained was 21.7% when using the abraded catalyst and 19.83 percent when using the untreated catalyst. There was thus an increase in ammonia synthesis of 1.24 percent corresponding to an increase of 5.9% in mass turnover.

What is claimed is:

1. A process for the production of ammonia synthesis catalyst and for the improvement of the catalyst activity thereof, which catalyst consists essentially of iron oxides, which comprises melting a mixture consisting mainly of iron oxides, allowing the melt to cool, and crushing the cooled melt, and then subjecting said catalyst to a rolling motion to round off sharp edges and corners of the crushed material while retaining the rounded surfaces in rough state which is capable by adhesion of retaining some of the finest dust produced in the rolling, whereby the resultant ammonia synthesis catalyst is of enhanced catalyst activity.

References Cited

UNITED STATES PATENTS

| 1,331,904 | 2/1920 | Elder | 252—459 X |
| 1,550,805 | 8/1925 | Harter | 252—459 |
| 1,636,685 | 7/1927 | Downs | 252—466 |
| 1,771,130 | 7/1930 | Larson | 252—466 X |
| 3,243,386 | 3/1966 | Nielsen et al. | 252—466 X |

DANIEL E. WYMAN, Primary Examiner.

CARL F. DEES, Assistant Examiner.

U.S. Cl. X.R.

252—477